US010858122B2

United States Patent
El Haloui et al.

(10) Patent No.: US 10,858,122 B2
(45) Date of Patent: Dec. 8, 2020

(54) PROPELLER HEALTH MONITORING

(71) Applicant: Ratier-Figeac SAS, Figeac (FR)

(72) Inventors: Abdellah El Haloui, Figeac (FR); Bruno Petellaz, Beduer (FR)

(73) Assignee: RATIER-FIGEAC SAS, Figeac (FR)

( * ) Notice: Subject to any disclaimer, the term of this patent is extended or adjusted under 35 U.S.C. 154(b) by 119 days.

(21) Appl. No.: 15/698,855

(22) Filed: Sep. 8, 2017

(65) Prior Publication Data
US 2018/0079523 A1 Mar. 22, 2018

(30) Foreign Application Priority Data
Sep. 16, 2016 (EP) .................... 16306182

(51) Int. Cl.
*B64D 45/00* (2006.01)
*G07C 5/00* (2006.01)
*G07C 5/08* (2006.01)
*G01H 3/08* (2006.01)
*G01H 1/06* (2006.01)
*G01M 5/00* (2006.01)
*G01H 1/00* (2006.01)
*B64F 5/60* (2017.01)
(Continued)

(52) U.S. Cl.
CPC .............. *B64D 45/00* (2013.01); *B64F 5/60* (2017.01); *G01H 1/003* (2013.01); *G01H 3/06* (2013.01); *G01H 3/08* (2013.01); *G01M 5/0016* (2013.01); *G01M 5/0066* (2013.01); *G07C 5/006* (2013.01); *G07C 5/0808* (2013.01); *B64C 11/00* (2013.01); *B64D 47/00* (2013.01); *B64D 2045/0085* (2013.01)

(58) Field of Classification Search
CPC .......... H02K 7/14; H02K 11/33; B60S 1/566; B60S 1/0818; B64D 45/00; B64D 47/00; B64D 2045/0085; G01M 5/0016; G01M 5/0066; G01H 1/003; G01H 3/06; G01H 3/08; B64F 5/60; G07C 5/006; G07C 5/0808; B64C 11/00
USPC ............................................................ 701/41
See application file for complete search history.

(56) References Cited

U.S. PATENT DOCUMENTS 5,152,172 A 10/1992 Leon et al.
5,206,816 A 4/1993 Hill et al.
(Continued)

FOREIGN PATENT DOCUMENTS

EP 2594912 A1 5/2013
WO 2007071912 A2 6/2007

OTHER PUBLICATIONS

EP Search Report for International Application No. 16306182.3 dated Mar. 14, 2017, 9 pages.

*Primary Examiner* — Khoi H Tran
*Assistant Examiner* — Rodney P King
(74) *Attorney, Agent, or Firm* — Cantor Colburn LLP

(57) ABSTRACT

A method for monitoring the health of propellers in an aircraft is provided. The method includes receiving pressure waves generated by at least one rotating propeller and analysing data corresponding to the received pressure waves to detect tonal noise which is within a selected frequency range. If tonal noise at harmonics of the propeller rotational frequency within the selected frequency range is detected within the selected frequency range, it is established that the health of at least one propeller may be impaired and an alert is created for inspection and maintenance to take place.

17 Claims, 5 Drawing Sheets

(51) Int. Cl.
*G01H 3/06* (2006.01)
*B64C 11/00* (2006.01)
*B64D 47/00* (2006.01)

(56) References Cited

U.S. PATENT DOCUMENTS

| | | | |
|---|---|---|---|
| 5,352,090 | A | 10/1994 | Churchill et al. |
| 6,629,463 | B2 | 10/2003 | Naudet et al. |
| 8,869,537 | B2 | 10/2014 | Geis et al. |
| 9,395,337 | B2 | 7/2016 | Newman |
| 2009/0019938 | A1 | 1/2009 | Klosinski |
| 2009/0035137 | A1* | 2/2009 | Jolly ............... B64C 27/001 416/145 |
| 2011/0219741 | A1 | 9/2011 | Ernst et al. |
| 2011/0229322 | A1* | 9/2011 | Tadayon ............ F03D 1/065 416/91 |
| 2013/0268154 | A1* | 10/2013 | Kreitmair-Steck ....... B64F 5/60 701/29.1 |
| 2014/0208163 | A1* | 7/2014 | Domke ............... G05B 23/00 714/37 |
| 2015/0345325 | A1 | 12/2015 | Khibnik |
| 2016/0244148 | A1* | 8/2016 | Linch ................ B64C 11/20 |

\* cited by examiner

PROPELLER HEALTH MONITORING

FOREIGN PRIORITY

This application claims priority to European Patent Application No. 16306182.3 filed Sep. 16, 2016, the entire contents of which is incorporated herein by reference.

TECHNICAL FIELD

This disclosure relates to the technical area of health monitoring of propellers for providing a warning or an indication that maintenance is required. In particular, the field of the disclosure lies in the area of aircraft engine propellers.

BACKGROUND OF THE DISCLOSURE

It is known in the art to monitor the health of propeller blades on an aircraft to assess if maintenance work needs to be carried out. This prevents unnecessary maintenance checks being undertaken and also provides early warnings of damage.

It is generally known in the art to monitor the health of individual blades on a propeller, by analysing the vibrations of each individual blade in a non-destructive manner. For example, U.S. Pat. No. 5,206,816 A and US 2015/0345325 A1 disclose methods of sensing a time at which a blade tip of a propeller passes a particular point. This information is compared with an expected blade tip arrival time and thus the vibration of the individual propeller blade can be deduced. This can then be compared to an expected blade vibration for a healthy blade and so the presence of a damaged individual blade can be detected.

U.S. Pat. No. 6,629,463 B2 discloses mechanically exciting each blade of a propeller and using an acoustic sensor to receive the frequency response, which can then be analysed.

Similarly, U.S. Pat. No. 5,152,172 makes use of an acoustic sensor to detect resonant vibration of individual blades, while U.S. Pat. No. 8,869,537 B2 utilises a microphone to determine if particles have impacted the propeller and the weather conditions outside of the aircraft to adjust the operation of the gas turbine engine accordingly.

In all of the above cases, complicated and detailed analysis is required for each individual blade of a propeller, which can be complex and expensive to implement. The present disclosure aims to provide a solution to these and other problems.

SUMMARY OF THE DISCLOSURE

According to a first aspect of the disclosure, there is provided a method for monitoring aircraft propeller health comprising: receiving pressure waves generated by at least one rotating propeller; analysing data corresponding to the received pressure waves to detect tonal noise which is within a selected frequency range; and establishing that the health of at least one propeller may be impaired if tonal noise at harmonics of the propeller rotational frequency within the selected frequency range is detected.

The selected frequency range may be below a fundamental blade passing frequency, defined as the number of propeller blades which pass a point on the path of rotation each second. The selected frequency range may be a frequency range between the fundamental frequency of the rotation of the propeller and the fundamental blade passing frequency. The fundamental blade passing frequency may be calculated using the formula N*rpm/60, wherein N is the number of blades on the propeller and rpm/60 is the number of rotations of the propeller per second.

The method may further comprise creating an alert for maintenance if it is established that the health of at least one propeller may be impaired.

The pressure waves may be received by a pressure wave sensor such as an acoustic sensor, optionally a microphone. The pressure wave sensor may be located on an aircraft fuselage, on a nacelle, on an aircraft wing or in an aircraft cockpit.

The method may further comprise: detecting an aircraft operating condition and establishing from the aircraft operating condition whether the aircraft is operating in steady state conditions; and sending an alert for maintenance only if both of: the aircraft is deemed to be operating in steady state conditions; and tonal noise at harmonics of the propeller rotational frequency is detected.

The aircraft operating conditions may include at least one of: the indicated air speed of the aircraft; the altitude of the aircraft; and the shaft horsepower of an engine of the aircraft.

The aircraft may have multiple propellers and when it is established that the health of at least one propeller may be impaired, the method may further comprise: determining, using an algorithm, which propeller or propellers is/are damaged and revising the alert message accordingly.

According to a second aspect of the disclosure, there is provided an apparatus for monitoring aircraft propeller health, comprising: a pressure wave sensor configured to receive pressure waves generated by at least one rotating propeller of an aircraft; and a control unit configured to: analyse the data corresponding to the received pressure waves to detect tonal noise which is within a selected frequency range within the selected frequency range; and establish that the health of at least one propeller may be impaired if tonal noise at harmonics of the propeller rotational frequency is detected.

The selected frequency range may be below a fundamental blade passing frequency, defined as the number of propeller blades which pass a point on the path of rotation of the propeller blades each second. The fundamental blade passing frequency may be calculated using the formula N*rpm/60, wherein N is the number of blades on the propeller and rpm/60 is the number of rotations of the propeller per second.

The control unit may be further configured to create an alert for maintenance if it is established that the health of at least one propeller may be impaired.

The control unit may be further configured to: detect an aircraft operating condition and establish from the aircraft operating condition whether the aircraft is operating in steady state conditions; and send an alert for maintenance only if both of: the aircraft is deemed to be operating in steady state conditions; and tonal noise at harmonics of the propeller rotational frequency is detected.

The aircraft operating conditions may include at least one of: the indicated air speed of the aircraft; the altitude of the aircraft; and the shaft horsepower of an engine of the aircraft.

According to a third aspect of the disclosure, there is provided an aircraft comprising an apparatus for monitoring aircraft propeller health of the second aspect, optionally wherein the pressure wave sensor such as an acoustic sensor, which may be a microphone, is located on an aircraft fuselage, on a nacelle, on an aircraft wing or in an aircraft cockpit. The aircraft may have multiple propellers. The control unit may be further configured to determine, if it is established that the health of at least one propeller may be impaired, which propeller or propellers is/are damaged and revise the alert message accordingly.

According to a fourth aspect of the disclosure, there is provided an apparatus configured to monitor aircraft propeller health according to the method of any of the embodiments of the first aspect.

BRIEF DESCRIPTION OF THE FIGURES

Preferred embodiments of the present disclosure will now be described by way of example only and with reference to the accompanying drawings, in which.

DETAILED DESCRIPTION

Noise generated by a propeller consists predominantly of a fundamental tone at the blade passing frequency (BPF) (first harmonic), together with a series of subsequent harmonics which are integer multiples of the BPF. The BPF results from the air impulses which occur every time a blade passes a given point. The number of times these impulses occur each second determines the fundamental BPF. Thus, the blade passing frequency is defined as the number of blades passing a certain point along the path of rotation every second and can be calculated using Equation 1:

$$BPF=N*rpm/60 \quad (1)$$

where N is the number of blades on the propeller in question, and rpm/60 is the number of rotations of the propeller per second.

By way of numerical example, for a propeller having 6 blades (i.e. N=6) and rotating at 1200 rpm (i.e. rpm/60=20 Hz), the Blade Passing Frequency would be BPF=120 Hz. The harmonics thereof would be 120 Hz (the fundamental frequency or first harmonic), 240 Hz (second harmonic), 360 Hz (third harmonic), 480 Hz (fourth harmonic), etc.

The present inventors have recognised that the blades of a propeller each generate a particular sound as they pass a point on their path of rotation. This sound will be the same for identical blades but will be different for different blades. Since propeller blades are generally spaced at regular intervals around the circumference of the propeller, a regular, repetitive sound will be made as each of N propeller blades passes that point, spaced apart by 1/N of a period of rotation. Each blade passes the point once per each rotation of the propeller, i.e. with the same frequency as the rotational frequency of the propeller, given by rpm/60.

Figure 1A:
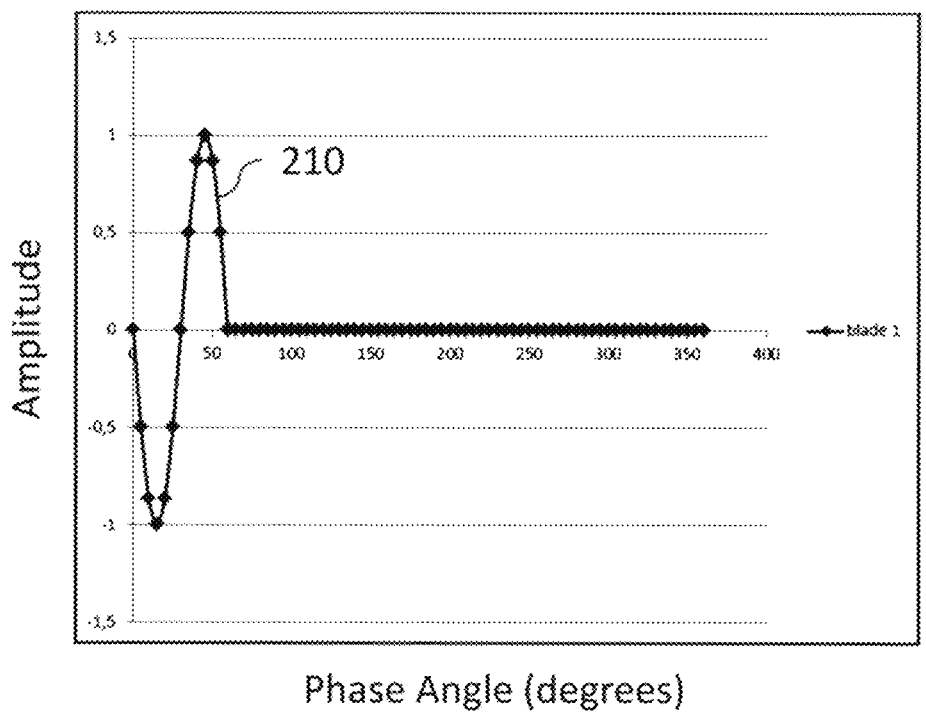
FIGS. 1A and 1B show graphs depicting phase shifted sine waves for each of two different healthy blades on a six-bladed propeller.
Figure 1B:
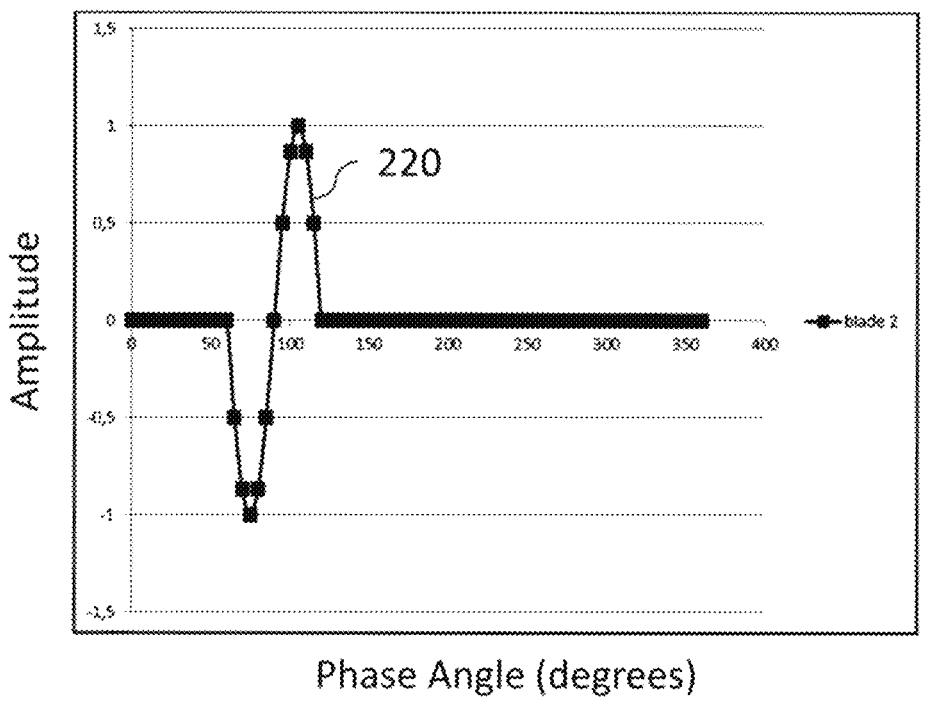

When a propeller is completely healthy, i.e. has no damaged blades and all of the blades are identical, the same sound will be produced by each blade but phase-shifted by 1/N of a period of rotation. This can be understood with reference to FIGS. 1A and 1B. FIG. 1A depicts a simplified sound in the form of a sine wave 210 for a first blade of a six-bladed propeller (N=6) and FIG. 1B depicts the same sound 220 for a second blade of the same propeller, but having a phase shift of 60° (i.e. $2\pi/6$, or ⅙ of a period) compared to the first sine wave 210.

Figure 2A:
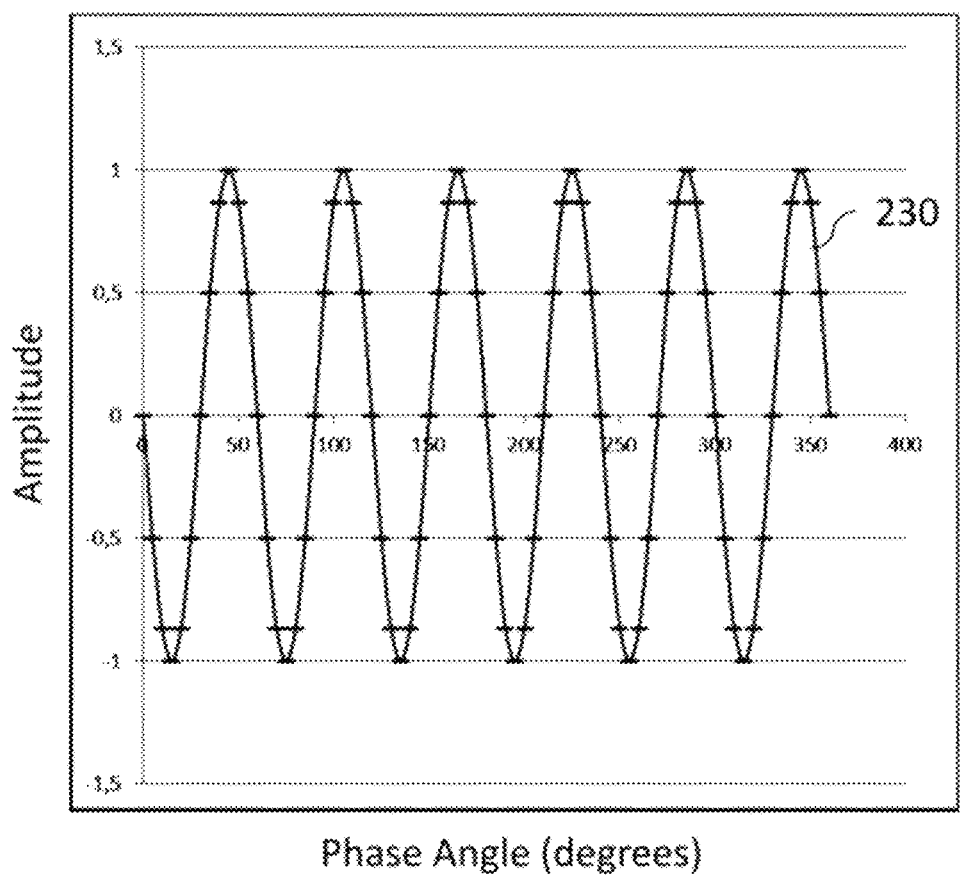
FIG. 2A shows on a graph a summation of the sine waves (similar to those shown in FIGS. 1A and 1B) for a healthy six bladed propeller, giving a blade passing frequency.
Figure 2B:
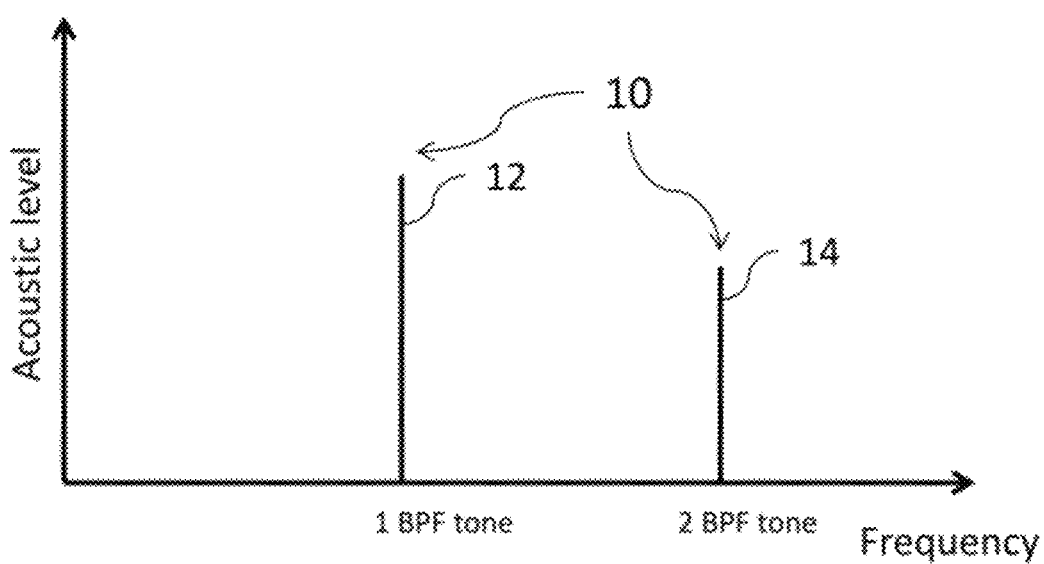
FIG. 2B shows a schematic graph depicting detected frequencies only at blade passing frequencies as shown in FIG. 2A and harmonics thereof, indicating a healthy propeller (i.e. normal operation)

If the combined sound of these blades is heard, in the form of a summation of N sounds, a regularity will be observed in the form of a higher frequency. This summation 230 is shown in FIG. 2A, where a clear regular higher frequency can be observed. This higher frequency is the blade passing frequency (BPF) (as described above), given by N*rpm/60, where N is the number of blades on the propeller and rpm/60 is the rotational frequency of the propeller. Consequently, for a healthy propeller, the BPF and subsequent harmonics thereof can be consistently detected in the noise produced by the propeller, and not rotation frequency harmonics (i.e. lower frequencies associated with rotation of an individual blade). This is shown in FIG. 2B. As can be seen, for a healthy propeller (or set of identical healthy propellers), the only frequencies which are detected are the Blade Passing Frequency (BPF) and subsequent harmonics thereof 10, whereas the rotation frequency harmonics are not detectable. In FIG. 2B the solid line 12 represents the fundamental BPF whilst the solid line 14 represents the second harmonic tone.

The inventors have furthermore importantly recognised that when a single propeller blade is damaged and/or degraded, the prominent tonal noise changes, to include the rotation frequency harmonics. This is because when the blade is damaged, the stiffness changes and thus both steady and cyclic aerodynamic response for that blade changes, leading to a change in acoustic signature. The change in acoustic signature for at least one blade results in a different sound contribution by the damaged blade(s) to the overall noise produced by the propeller. Each of the N propeller blades contributes to the noise produced by the blade for 1/N of the time of rotation. Thus an irregular sound produced by a damaged blade in each rotation will provide additional lower frequencies at rotation frequency harmonics. Consequently, in addition to the BPF harmonics, the rotation frequency and harmonics thereof become detectable.

Figure 3A:
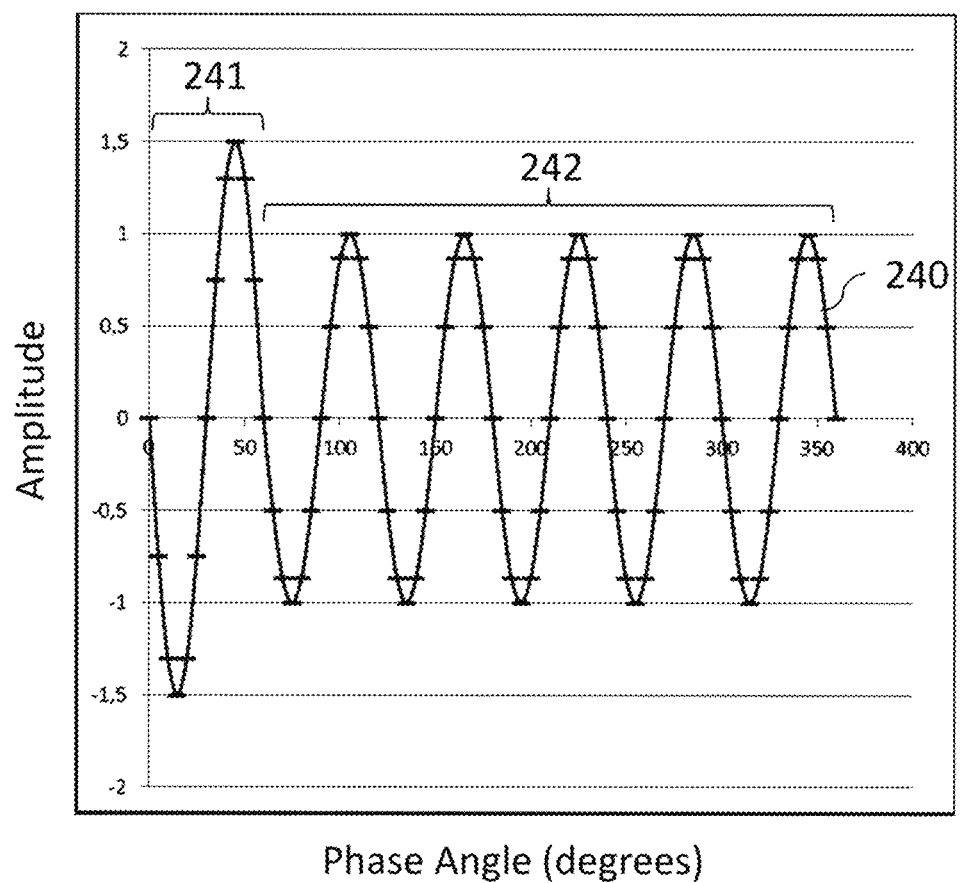
FIG. 3A shows on a graph a summation of the sine waves (some similar to those shown in FIGS. 1A and 1B) for a damaged six bladed propeller where one blade is damaged, resulting in a propeller rotational frequency being observed.

A case in point is shown in FIG. 3A, which shows the summation 240 for a six-bladed propeller. Clearly, the "first" damaged propeller blade contributes a very different noise (wave portion 241) to the detected sounds compared to the other five healthy propeller blades (wave portion 242). Thus it is clear that while the BPF harmonics may continue to be detected, additionally, lower frequencies, i.e. tonal noise, at harmonics of the rotational frequency of the propeller will be detected. The present inventors have developed the methodology and apparatus of the present disclosure based on this principle.

By way of numerical example, for the same propeller as above having 6 blades and rotating at 1200 rpm (i.e. rpm/60=20 Hz), the rotational frequency harmonics are at 20 Hz, 40 Hz, 60 Hz, 80 Hz, 100 Hz, etc., while the BPF harmonics are given by 120 Hz, 240 Hz, 360 Hz, 480 Hz, etc.

Figure 3B:
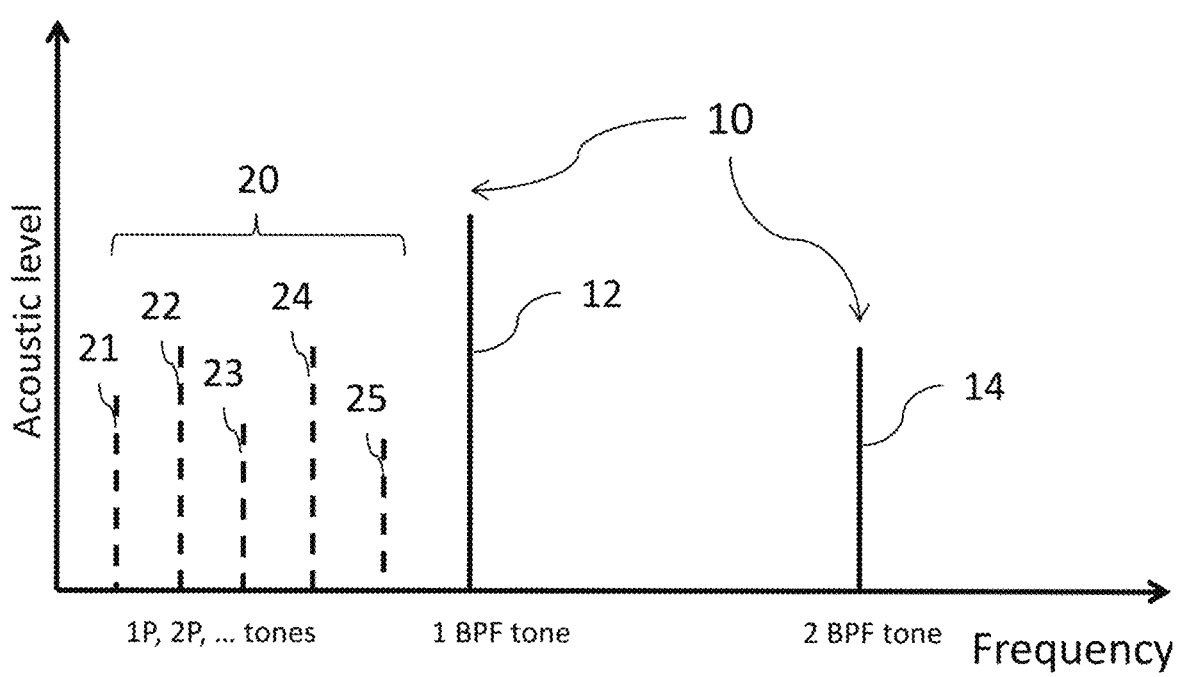
FIG. 3B shows the schematic graph of FIG. 2B, further depicting detected frequencies at propeller rotation frequencies as shown in FIG. 3A and harmonics thereof, indicating at least one damaged propeller (i.e. degraded operation)

FIG. 3B depicts frequencies produced by at least one propeller, at least one of which is damaged, such as in the manner of the propeller which is described above in relation to FIG. 3A. The damaged or degraded propeller(s) produces the dashed lines 20 depicting the additional rotational tonal frequency harmonics (i.e. tonal noise) 21, 22, 23, 24, 25 at lower frequencies, while the higher frequencies at the Blade Passing Frequency harmonics 10 are still produced, depicted by the solid lines 12, 14.

Figure 4:
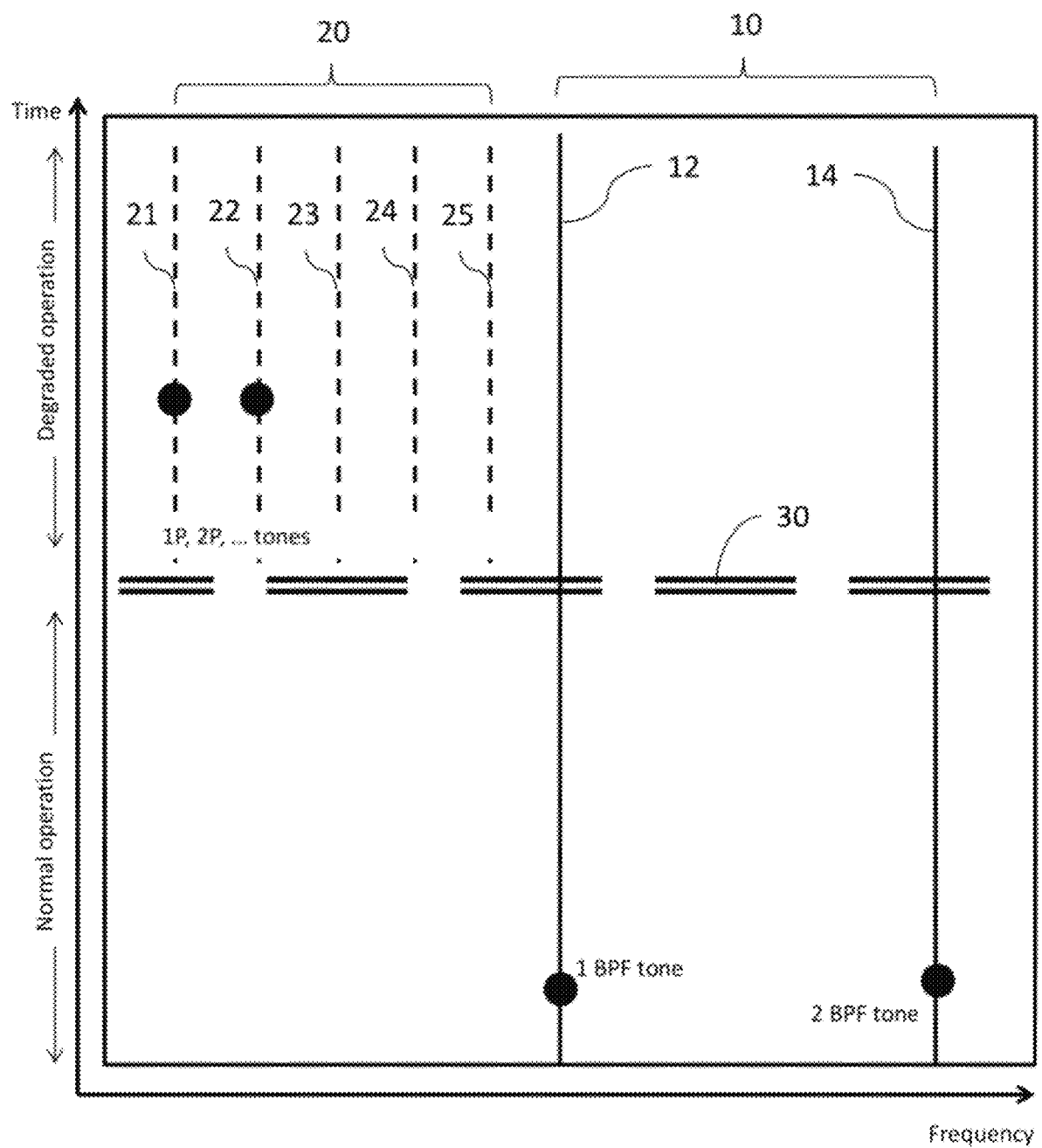
FIG. 4 shows a schematic LOFARgram, depicting the peak frequencies occurring over time both before and after a damaging event.

Turning now to FIG. 4, the frequency data can be depicted on a diagram called a LOFARgram, a LOw Frequency Analysis and Recording diagram, which represents frequencies produced over time. FIG. 4 illustrates the same situation as FIG. 3B, i.e. frequencies from at least one propeller, at least one of which is damaged. It is clear to see in FIG. 4 that at earlier times (lower down along the time axis, indicated by "normal operation"), at least in the depicted frequency range, there are only two detected frequencies, at regular intervals. These represent the first two harmonics of the Blade Passing Frequency (e.g. using the numerical data above, these would be 120 Hz, 240 Hz and 360 Hz respectively).

At a certain point in time 30, an event (e.g. a short or progressive event) occurs which damages the blade. After this time point 30, as seen from the upper portion of the graph, some new, lower frequencies 20 are now visible. These are the harmonics of the propeller rotation frequency and are depicted collectively as 20, and individually as frequencies 21, 22, 23, 24, 25. Thus it is clear that at least one propeller has incurred some damage from the event at time point 30 and as a result, these lower frequency harmonics 20 are now detectable in addition to the BPF harmonics 10 (indicated as "degraded operation").

There may also be at least one undamaged propeller additionally contributing to the recorded frequencies, but only producing frequencies at BPF harmonics. The sounds produced by multiple propellers may be recorded using the same pressure sensor, such as an acoustic sensor (e.g. a microphone) and then in the case of damage, an algorithm may be applied to detect which propeller is damaged and thus contributing the lower tonal frequencies.

From FIG. 4 and the discussion above, it is clear that at least some of the harmonics of the rotation frequency will always be at a lower frequency than the lowest harmonic (fundamental frequency) of the BPF. Thus it may only be necessary to monitor a frequency spectrum between the first harmonic (fundamental frequency) of the rotation frequency and the first harmonic of the BPF, to detect potential propeller damage.

Figure 5:
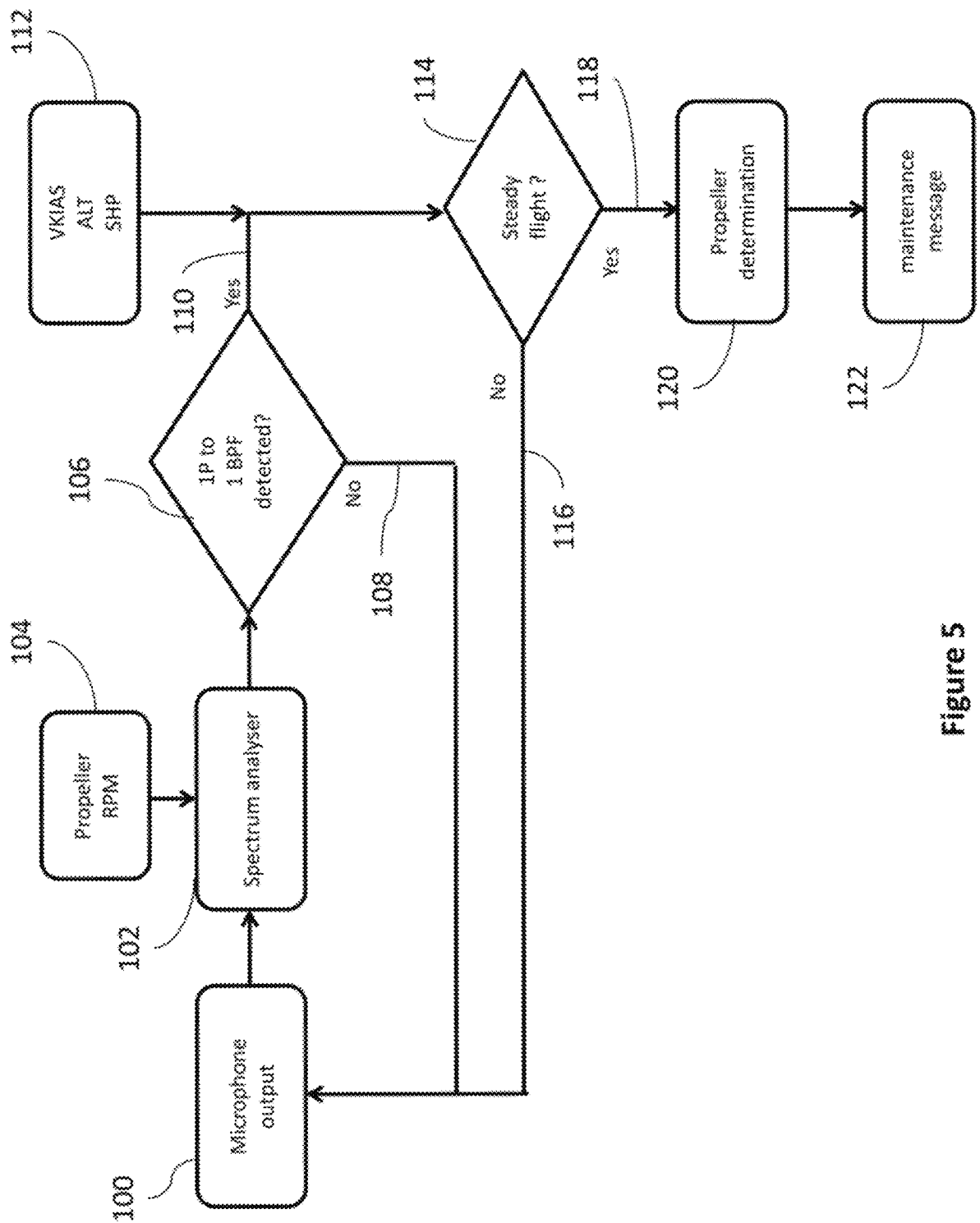
FIG. 5 is a flow diagram depicting a method according to an embodiment of the present disclosure.

FIG. 5 depicts a method for monitoring the health of one or more aircraft propellers according to one embodiment of the present disclosure. Throughout the method, a pressure wave sensor, such as an acoustic sensor (e.g. a microphone) is constantly detecting pressure variation, i.e. pressure waves (optionally an acoustic signal) produced by the aircraft, in particular by the propeller(s). A pressure wave sensor, such as an acoustic sensor (e.g. a microphone) may be installed specifically for this task, e.g. on the fuselage, nacelle, or the wings near the propeller. However, the present inventors have recognised that pressure wave sensors, such as acoustic sensors (e.g. microphones) are already conventionally used to monitor noise in aircraft. For example, to record sounds within the cockpit for later analysis in case something goes wrong, i.e. the Cockpit Voice Recorder, CVR, in an aircraft "black box", or to monitor noise for noise certification requirement tests. Thus, existing instrumentation may be used to detect the noise in the method of the disclosure, or indeed, noise detected for other reasons may then be further analysed to perform the method of the present disclosure. Whilst one pressure wave sensor, such as an acoustic sensor (e.g. a microphone), may be sufficient for noise detection, in embodiments more than one may be provided, for example located on different parts of the aircraft.

At step 100, digital output from a pressure wave sensor that receives pressure waves (e.g. sound waves) generated by at least one rotating propeller, such as an acoustic sensor (e.g. a microphone), is sent to a spectrum analyser 102. This digital output comprises data corresponding to the received pressure waves, e.g. data representing the pressure waves. The spectrum analyser 102 also takes as its input data including the propeller rotational frequency (rpm) 104, as well as the number of blades N on the propeller. Using the equations described above, the spectrum analyser analyses a portion of the frequency spectrum in a selected frequency range between the fundamental frequency of the shaft (propeller) rotation, given by 1P (calculated by rpm/60) and the fundamental frequency of the BPF given by 1BPF (calculated by N*rpm/60), where "N" and "rpm/60" have the same meaning as in Equation 1 above. The spectrum analyser may be a stand-alone device, or may be integrated into existing control functionality e.g. the propeller LRUs (Line Replacement Units) or the FADEC (Full Authority Digital Engine Control) of the aircraft. Since the rotational frequency of the propeller is required, which will be available to the FADEC, integrating into the FADEC may offer particular advantages.

At step 106 of the method, a control unit analyses whether any tonal noise at harmonics of the propeller rotational frequency within the 1P to 1BPF range have been detected. If not, at step 108, the method loops back to carry on analysing the current frequency input from the pressure wave sensor with step 100.

However, if tonal noise at harmonics of the propeller rotational frequency within the 1P to 1BPF range is present, this may indicate that the health of at least one propeller is impaired, i.e. it is damaged and the method continues at branch 110.

It is possible that the presence of the detected frequencies may however not be caused by blade damage, but due to a transient flight condition. Thus, in order to help prevent a false alarm, various inputs 112 are used to help analyse the aircraft operating conditions. These may include one or more of (but are not limited to) the VKIAS (indicated air speed of the aircraft measured in Knots), ALT (altitude of the aircraft) and SHP (engine shaft horsepower).

Taking one or more of these operating conditions 112 into account, at step 114, the control unit determines if the aircraft is operating at steady flight. If it is determined that the aircraft is not in steady flight, then the detected frequencies may be due to transient flight conditions, so at step 116 the method loops back to continue analysing the current frequency input from the pressure wave sensor with step 100. However, if an indication is given at 118 that the aircraft is experiencing steady flight conditions, then it is apparent that there may be some propeller damage.

Consequently, if the pressure wave sensor is recording data from several propellers at step 120, various algorithms are applied to determine which one or more propellers have a fault and are damaged. For example, one method is to change the rotational frequency (rpm) of at least one of the propellers, to see if that propeller is the damaged propeller. As described above in relation to FIGS. 3A and 3B, if a propeller is damaged, then rotational frequency harmonics of the damaged propeller are additionally observed. Conversely, if a propeller is healthy, the only detectable frequencies produced are the BPF harmonics, as described above in relation to FIGS. 2A and 2B. Thus to check if a particular propeller has been damaged and is causing detectable rotation frequency harmonics, the rotational frequency of the propeller can be altered (increased or decreased). Clearly, if the propeller is the damaged propeller, then the detected rotation frequency harmonics will change in frequency. Conversely, if the propeller is healthy, changing its rotational frequency will not affect the detected rotation frequency harmonics. So this method requires a simple comparison of altered rotational frequency of each of the propellers with the detected rotational frequency harmonics, until the damaged propeller(s) is/are identified.

Alternatively, if only one propeller is being monitored, then this step can be omitted.

Finally, at step 122, it is established that the health of at least one propeller may be impaired, i.e. that the propeller(s) may be damaged and a maintenance message is raised as an alert, e.g. a warning, to the pilot or maintenance crew, to ensure timely servicing and repair of the propellers.

The present disclosure thus provides important advantages over the prior art. It can be quickly and easily determined if a propeller as a whole has suffered some damage, without needing to inspect or analyse each individual blade. No instrumentation on each blade is required; indeed, no instrumentation on the rotating part of the propeller is required. The method can be implemented using commonly available components, e.g. a pressure wave sensor, such as an acoustic sensor (e.g. a microphone), and a spectrum analyser, thus avoiding the cost of bespoke instrumentation. In fact as discussed above, instrumentation already present on the aircraft may be used to collect the noise, and/or noise data already collected may be used in the method of the disclosure, thus minimising additional components required and minimising the data processing required to implement the disclosure. The method and apparatus of the disclosure is effective in detecting both slow degradation of blade structure and isolated events e.g. foreign object damage (FOD), actuation issues such as backlash or bearing roller wear, or any event producing a blade to blade pitch angle mismatch.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A method for monitoring aircraft propeller health comprising:
   receiving on a pressure wave sensor pressure waves generated by rotation of at least one rotating propeller; monitoring only a frequency spectrum between the first harmonic of the rotation frequency and the first harmonic of the blade passing frequency (BFF) during operation of the propeller;
   analyzing within a selected frequency range, on a control unit, frequency data corresponding to the received pressure waves to detect tonal noise which is within the selected frequency range, wherein the selected frequency range is a frequency range between a fundamental frequency of the rotation of the propeller and a fundamental blade passing frequency defined as the number of propeller blades which pass a point on the path of rotation each second; and
   establishing on a control unit that the health of at least one propeller may be impaired if tonal noise at harmonics of the propeller rotational frequency within the selected frequency range is detected.

2. The method as claimed in claim 1,
   wherein the fundamental blade passing frequency is calculated using the formula N*rpm/60, wherein N is the number of blades on the propeller and rpm/60 is the number of rotations of the propeller per second.

3. The method as claimed in claim 1, further comprising creating an alert for maintenance if it is established that the health of at least one propeller may be impaired.

4. The method as claimed in claim 1, pressure wave sensor is acoustic sensor.

5. The method as claimed in claim 4, wherein the acoustic sensor is a microphone.

6. The method as claimed in claim 1, further comprising:
   detecting an aircraft operating condition and establishing from the aircraft operating condition whether the aircraft is operating in steady state conditions; and
   sending an alert for maintenance only if both of:
      the aircraft is deemed to be operating in steady state conditions; and
      tonal noise at harmonics of the propeller rotational frequency is detected.

7. The method as claimed in claim 6, wherein the aircraft operating conditions include at least one of:
   the indicated air speed of the aircraft;
   the altitude of the aircraft; and
   the shaft horsepower of an engine of the aircraft.

8. The method as claimed in claim 1, wherein the aircraft has multiple propellers and wherein when it is established that the health of at least one propeller may be impaired, the method further comprises:
   determining, using an algorithm, which propeller is damaged and revising the alert message accordingly.

9. An computing apparatus configured to monitor aircraft propeller health according to the method of claim 1.

10. The method as claimed in claim 1, wherein pressure wave sensor is located on an aircraft fuselage, on a nacelle, on an aircraft wing or in an aircraft cockpit.

11. An apparatus for monitoring aircraft propeller health, comprising:
- a pressure wave sensor configured to receive pressure waves generated by at least one rotating propeller of an aircraft; and
- a control unit configured to; monitor only a frequency spectrum between the first harmonic of the rotation frequency and the first harmonic of the blade passing frequency (BFF);
    - analyze within a selected frequency range, frequency data corresponding to the received pressure waves to detect tonal noise which is within the selected frequency range, wherein the selected frequency range is a frequency range between a fundamental frequency of the rotation of the propeller and a fundamental blade passing frequency defined as the number of propeller blades which pass a point on the path of rotation each second; and
    - establish that the health of at least one propeller may be impaired if tonal noise at harmonics of the propeller rotational frequency is detected within the selected frequency range.

12. An apparatus as claimed in claim 11, wherein the fundamental blade passing frequency is calculated using the formula N*rpm/60, wherein N is the number of blades on the propeller and rpm/60 is the number of rotations of the propeller per second.

13. The apparatus as claimed in claim 11, wherein the control unit is further configured to create an alert for maintenance if it is established that the health of at least one propeller may be impaired.

14. The apparatus as claimed in claim 11, wherein the control unit is further configured to:
- detect an aircraft operating condition and establish from the aircraft operating condition whether the aircraft is operating in steady state conditions; and
- send an alert for maintenance only if both of:
    - the aircraft is deemed to be operating in steady state conditions; and
    - tonal noise at harmonics of the propeller rotational frequency is detected.

15. The apparatus as claimed in claim 14, wherein the aircraft operating conditions include at least one of:
- the indicated air speed of the aircraft;
- the altitude of the aircraft; and
- the shaft horsepower of an engine of the aircraft.

16. The apparatus as claimed in claim 11, in combination with an aircraft and wherein the pressure wave sensor is located on one of: an aircraft fuselage; a nacelle; an aircraft wing; or an aircraft cockpit or the aircraft.

17. The apparatus as claimed in claim 16, wherein the aircraft includes:
- multiple propellers; and
- wherein the control unit is further configured to determine, if it is established that the health of at least one propeller may be impaired, which propeller is damaged and revise the alert message accordingly.

* * * * *